Nov. 17, 1931.  E. A. NORMAND  1,832,045
FREIGHT HOOK
Filed May 28, 1930

INVENTOR.
ERNEST A. NORMAND
BY Charles S. Evans
HIS ATTORNEY

Patented Nov. 17, 1931

1,832,045

UNITED STATES PATENT OFFICE

ERNEST A. NORMAND, OF SAN FRANCISCO, CALIFORNIA

FREIGHT HOOK

Application filed May 28, 1930. Serial No. 456,478.

My invention relates to hand hooks for handling packages of freight, and particularly to a device having a spatulate hook.

An object of my invention is to provide a hook that will not injure paperboard cartons.

Another object is to provide such a detachable member to be used in combination with an ordinary pointed freight hook to render the latter safe for use on cartons.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings.

Broadly stated my invention comprises a wide spatulate freight hook which may be used on paperboard cartons without injuring the contents.

Figure 1:
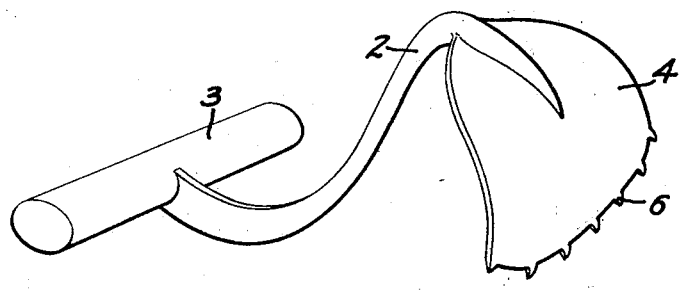
Figure 1 is a perspective view of the hook of my invention.

In greater detail and with reference first to Figure 1, my invention comprises an S-shaped iron or steel handle 2, on one end of which is fixed the hand grip 3 preferably of wood. On the other end of the handle is welded or otherwise suitably secured a plate 4, having sharp teeth 6 on one edge, and comprising a spatulate hook. The teeth are spaced apart as shown, leaving flat spaces between them to prevent penetration into the material of the package.

The teeth 6 of the serrated edge will hold ordinary package freight much more securely than the pointed freight hook ordinarily used by freight handlers, but will not penetrate paperboard cartons and burlap wrapped packages deeply enough to injure the contents. On account of the multiplicity of engaging points, the package itself is not injured.

Cartons suffer considerable damage when handled by ordinary freight hooks, and the use of the hook of my invention will save shippers from the financial loss incident to such damage.

Figure 2:
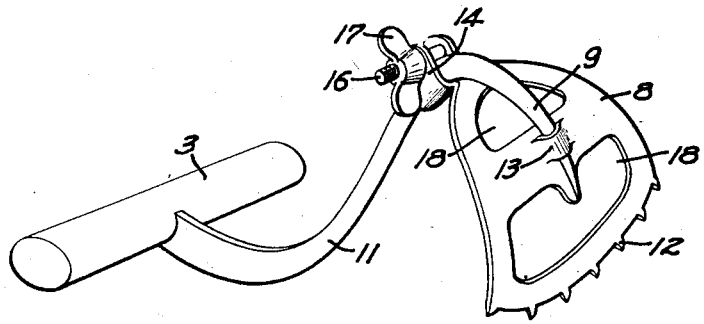
Figure 2 is a perspective view of an ordinary pointed freight hook with a detachable spatulate or blade-like hook fixed to it.

A variant form of my invention is shown in Figure 2, in which a separate plate 8 forms the spatulate hook. The plate is adapted to receive the pointed end 9 of an ordinary freight hook 11, and readily detachable means are provided for fixing the plate in place on the hook so that a combination instrument is available for either type of freight.

The plate 8 is provided on one edge with sharp teeth 12, so that it may perform the same function as the structure shown in Figure 1. A loop 13 is preferably struck out of the plate to form means for socketing the pointed end 9 of the freight hook; and a clamp is also provided for holding the parts together, comprising the bent tongues 14, through which the tightening screw 16 with the wing nut 17 passes. Since the loop or socket 13 and the clamp lie in different planes on the curved pointed hook, relative twisting between the spatulate hook and its mounting cannot occur.

This form of my invention is particularly useful to contract stevedores, who object to carrying two hooks, as the spatulate attachment can be easily carried and used when handling fragile package goods, leaving the bare pointed hook for use on baled hay, straw, and similar freight for which a pointed hook is necessary.

In order to lighten the hook of my invention, portions may be removed from the plate portion thereof leaving apertures 18 as shown in Figure 2.

I claim:

1. In a freight hook a detachable blade-like engaging member.

2. In a freight hook a detachable blade-like engaging member having a serrated edge.

3. In combination with a pointed freight hook, a blade-like engaging member having a socket in which the point of the hook is adapted to engage, and means for fixing the hook in the socket.

4. In combination with a pointed freight hook, a blade-like engaging member having a serrated edge and in which there is a socket, and clamp means for fixing the pointed freight hook in the socket.

In testimony whereof, I have hereunto set my hand.

ERNEST A. NORMAND.